United States Patent
Bamba

(10) Patent No.: US 9,954,637 B2
(45) Date of Patent: Apr. 24, 2018

(54) WAVELENGTH SELECTIVE DEVICE, WAVELENGTH SELECTIVE METHOD, AND WAVELENGTH SELECTIVE SYSTEM

(71) Applicant: FUJITSU LIMITED, Kawasaki-shi, Kanagawa (JP)

(72) Inventor: Masakazu Bamba, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 98 days.

(21) Appl. No.: 14/683,314

(22) Filed: Apr. 10, 2015

(65) Prior Publication Data

US 2015/0365188 A1    Dec. 17, 2015

(30) Foreign Application Priority Data

Jun. 12, 2014  (JP) ................................. 2014-121621

(51) Int. Cl.
*H04J 14/00*  (2006.01)
*H04J 14/02*  (2006.01)

(52) U.S. Cl.
CPC ...... *H04J 14/0224* (2013.01); *H04J 14/0257* (2013.01)

(58) Field of Classification Search
CPC ..... H04J 14/02; H04J 14/0257; H04J 14/0224
USPC .................................................. 398/43–103
See application file for complete search history.

(56) References Cited

U.S. PATENT DOCUMENTS

| | | | |
|---|---|---|---|
| 5,583,860 A | 12/1996 | Iwakawa et al. | |
| 7,716,271 B1 * | 5/2010 | Bertsekas | G06F 15/16 370/235 |
| 2002/0054732 A1 * | 5/2002 | Zheng | H04Q 11/0005 385/24 |
| 2002/0080829 A1 * | 6/2002 | Ofek | H04L 12/6418 370/539 |
| 2002/0118419 A1 * | 8/2002 | Zheng | H04Q 11/0005 398/101 |
| 2003/0020977 A1 * | 1/2003 | Smith | H04J 14/0283 398/5 |
| 2003/0035166 A1 * | 2/2003 | Zhang | H04J 14/0227 398/58 |
| 2004/0247317 A1 * | 12/2004 | Sadananda | H04L 45/02 398/57 |

(Continued)

FOREIGN PATENT DOCUMENTS

| | | |
|---|---|---|
| JP | 7-231322 | 8/1995 |
| JP | 2009-200781 | 9/2009 |

OTHER PUBLICATIONS

Tanwir, Network Resource Scheduling and Management of Optical Grids, 2007, NCSU Libraries, All Dcoument. http://www.lib.ncsu.edu/resolver/1840.16/1363.*

*Primary Examiner* — Ken N Vanderpuye
*Assistant Examiner* — Dibson Sanchez
(74) *Attorney, Agent, or Firm* — Staas & Halsey LLP

(57) ABSTRACT

A wavelength-selective device includes: a storage in which a wavelength management table is stored; and a processor configured to execute a procedure, the procedure including: searching for one or more paths used as a new path having a first ending time in a network, based on the wavelength management table; selecting a wavelength having a second ending time closest to the first ending time, from one or more wavelengths used on paths found by the searching; and configuring a path using the selected wavelength as the new path.

6 Claims, 18 Drawing Sheets

| WAVELENGTH | PATH TYPE | ENDING TIME | NUMBER OF USED WAVELENGTHS |
|---|---|---|---|
| 1 | DEFINITE TERM | 03/20/2013 12:00 | 1 |
| 2 | INDEFINITE TERM | 00/00/0000 00:00 | 2 |
| 3 | INDEFINITE TERM | 00/00/0000 00:00 | 1 |
| ⋮ | ⋮ | ⋮ | ⋮ |
| m | UNUSED STATE | NULL | 0 |
| ⋮ | ⋮ | ⋮ | ⋮ |
| n-2 | DEFINITE TERM | 05/02/2014 17:00 | 5 |
| n-1 | INDEFINITE TERM | 00/00/0000 00:00 | 3 |
| n | DEFINITE TERM | 02/02/2022 12:00 | 7 |

(56) References Cited

U.S. PATENT DOCUMENTS

| | | | |
|---|---|---|---|
| 2004/0258409 A1* | 12/2004 | Sadananda | H04L 45/02 398/50 |
| 2004/0264960 A1* | 12/2004 | Maciocco | H04Q 11/0066 398/49 |
| 2005/0030951 A1* | 2/2005 | Maciocco | H04Q 11/0066 370/395.2 |
| 2005/0063701 A1* | 3/2005 | Ovadia | H04Q 11/0066 398/45 |
| 2005/0089327 A1* | 4/2005 | Ovadia | H04L 45/04 398/47 |
| 2005/0105905 A1* | 5/2005 | Ovadia | H04L 45/62 398/47 |
| 2006/0188252 A1* | 8/2006 | Schluter | H04J 14/0227 398/25 |
| 2007/0147360 A1* | 6/2007 | Vogl | H04L 47/564 370/371 |
| 2007/0253712 A1* | 11/2007 | Katagiri | H04B 10/275 398/59 |
| 2010/0086306 A1* | 4/2010 | D'Alessandro | H04L 45/12 398/79 |
| 2010/0158528 A1* | 6/2010 | Resende | H04L 45/122 398/79 |
| 2012/0014246 A1* | 1/2012 | Matsumoto | H04L 41/0803 370/221 |
| 2012/0106958 A1* | 5/2012 | Sakamoto | H04J 14/0282 398/58 |
| 2012/0140775 A1* | 6/2012 | Kawahara | H04L 41/0896 370/437 |
| 2012/0275789 A1* | 11/2012 | Tanna | H04J 14/0257 398/49 |
| 2013/0051798 A1* | 2/2013 | Chen | H04Q 11/0005 398/49 |
| 2013/0216226 A1* | 8/2013 | Hirano | H04J 14/0267 398/51 |
| 2014/0093246 A1* | 4/2014 | Sambo | H04J 14/0201 398/83 |

* cited by examiner

FIG. 2

| WAVELENGTH | PATH TYPE | ENDING TIME | NUMBER OF USED WAVELENGTHS |
|---|---|---|---|
| 1 | DEFINITE TERM | 03/20/2013 12:00 | 1 |
| 2 | INDEFINITE TERM | 00/00/0000 00:00 | 2 |
| 3 | INDEFINITE TERM | 00/00/0000 00:00 | 1 |
| ⋮ | ⋮ | ⋮ | ⋮ |
| m | UNUSED STATE | NULL | 0 |
| ⋮ | ⋮ | ⋮ | ⋮ |
| n-2 | DEFINITE TERM | 05/02/2014 17:00 | 5 |
| n-1 | INDEFINITE TERM | 00/00/0000 00:00 | 3 |
| n | DEFINITE TERM | 02/02/2022 12:00 | 7 |

FIG. 6

| | AB | BC | CD | AE | BF | CG | DH | EF | FG | GH | EI | FJ | GK | HL | IJ | JK | KL |
|---|---|---|---|---|---|---|---|---|---|---|---|---|---|---|---|---|---|
| λ1 | #1 | #1 | | | | #1 | #4 | #4 | #4 | #4 | #4 | | #1 | | | | #1 |
| λ2 | #2 | #2 | #2 | #2 | #5 | | #2 | | | | | #5 | | | | #5 | |
| λ3 | | | | | | | #3 | | | | | | | #3 | #6 | #6 | #6 |
| λ4 | | | | | | | | | | | | | | | | | |
| λ5 | | | | | | | | | | | | | | | | | |

| | AB | BC | CD | AE | BF | CG | DH | EF | FG | GH | EI | FJ | GK | HL | IJ | JK | KL |
|---|---|---|---|---|---|---|---|---|---|---|---|---|---|---|---|---|---|
| λ1 | #1 | #1 | | | | #1 | #4 | #4 | #4 | #4 | #4 | | #1 | | | | #1 |
| λ2 | #2 | #2 | #2 | #2 | #5 | | #2 | | | | | #5 | | | | #5 | |
| λ3 | | | | #7 | | | #7 | | | | #7 | | | #7 | #7 | #7 | #7 |
| λ4 | | | | | | | | | | | | | | | | | |
| λ5 | | | | | | | | | | | | | | | | | |

FIG. 9

| | AB | BC | CD | AE | BF | CG | DH | EF | FG | GH | EI | FJ | GK | HL | IJ | JK | KL |
|---|---|---|---|---|---|---|---|---|---|---|---|---|---|---|---|---|---|
| λ1 | #1 | #1 | | | | #1 | | | | | | | #1 | | | #5 | #1 |
| λ2 | #2 | #2 | #2 | #2 | #5 | | #2 | | | | | #5 | | #3 | #6 | #6 | #6 |
| λ3 | | | | | | | #4 | #4 | #4 | #4 | #4 | | | | | | |
| λ4 | | | | | | | | | | | | | | | | | |
| λ5 | | | | | | | | | | | | | | | | | |

FIG. 10

| | AB | BC | CD | AE | BF | CG | DH | EF | FG | GH | EI | FJ | GK | HL | IJ | JK | KL |
|---|---|---|---|---|---|---|---|---|---|---|---|---|---|---|---|---|---|
| λ1 | #1 | #1 | | | #5 | #1 | #3 | | | | | #5 | #1 | #3 | | #5 | #1 |
| λ2 | #2 | #2 | #2 | #2 | | | #2 | | | | | | | | #6 | #6 | #6 |
| λ3 | | | | | | | #4 | #4 | #4 | #4 | #4 | | | | | | |
| λ4 | | | | | #7 | | #7 | | | | #7 | | | #7 | #7 | #7 | #7 |
| λ5 | | | | | | | | | | | | | | | | | |

WAVELENGTH SELECTIVE DEVICE, WAVELENGTH SELECTIVE METHOD, AND WAVELENGTH SELECTIVE SYSTEM

CROSS-REFERENCE TO RELATED APPLICATION

This application is based upon and claims the benefit of priority of the prior Japanese Patent Application No. 2014-121621, filed on Jun. 12, 2014, the entire contents of which are incorporated herein by reference.

FIELD

The embodiments discussed herein are related to a wavelength-selective device, a wavelength-selective method, and a wavelength-selective system.

BACKGROUND

In a related art, it has not been expected that the configuration of a path in a network is released, but it is expected that a dynamic network prevails in which a path is autonomously configured, designed, and released in the future. As a network device that forms an optical network, there are a time slot interchange (TSI) that includes a function to configure a channel, a time slot assignment (TSA) that is allowed to change a channel, and the like. The TSI is more expensive than the TSA, so that there is a demand to manage a dynamic network through the TSA.

In an optical network that is formed by the TSA, there is a technology by which a new path is configured based on a policy in which paths that are allowed to be used at the time of configuration of a path are searched for, and a path using the shortest wavelength is selected from among the plurality of found paths. In such a technology, for example, a path using the shortest wavelength is selected from among wavelengths that are currently being used by further paths. When there is no wavelength that is allowed to be used in the wavelengths that are being used by the further paths, a path using the shortest wavelength is selected from among unused wavelengths.

Japanese Laid-open Patent Publication No. 2009-200781 and Japanese Laid-open Patent Publication No. 7-231322 are the related arts.

SUMMARY

According to an aspect of the invention, a wavelength-selective device includes: a storage in which a wavelength management table is stored; and a processor configured to execute a procedure, the procedure including: searching for one or more paths used as a new path having a first ending time in a network, based on the wavelength management table; selecting a wavelength having a second ending time closest to the first ending time, from one or more wavelengths used on paths found by the searching; and configuring a path using the selected wavelength as the new path.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of a wavelength management table;

FIG. 6 is a first diagram illustrating path configuration;

FIG. 7 is a second diagram illustrating the path configuration;

FIG. 8 is a third diagram illustrating the path configuration;

FIG. 9 is a first diagram illustrating path configuration in a reference example 1;

FIG. 10 is a second diagram illustrating the path configuration in the reference example 1;

DESCRIPTION OF EMBODIMENTS

In an optical network, there is a case in which a wavelength resource is wasted at the time of configuration of a new path.

For example, when the configuration of a wavelength that is used for the new path is not released in some sections of the new path, an unused wavelength resource is to be assigned to the new path because a wavelength that is used for a further path is not assigned to the new path. Therefore, unless the configuration of a wavelength resource is released efficiently, a proportion to assign an unused wavelength resource is increased, and the wavelength resource is easily depleted.

A technology that is related to a wavelength-selective method, a wavelength-selective device, and a wavelength-selective system by which a wavelength resource may be used efficiently is described in detail below with reference to drawings. The technology discussed herein is not limited by embodiments of the wavelength-selective method, the wavelength-selective device, and the wavelength-selective system. The embodiments may be appropriately combined within a range that does not conflict processing contents.

Embodiments

Configuration of Wavelength-Selective Device

Figure 1:
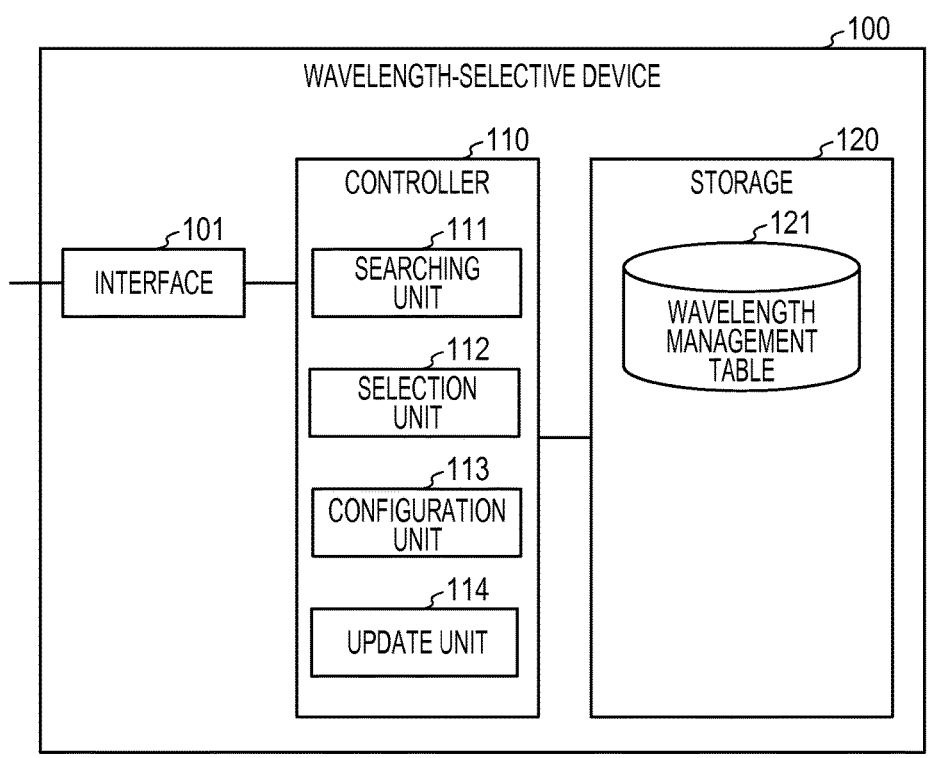
FIG. 1 is a diagram illustrating an example of a configuration of a wavelength-selective device.

FIG. 1 is a diagram illustrating an example of a configuration of a wavelength-selective device. As illustrated in the example of FIG. 1, a wavelength-selective device 100 includes an interface 101, a controller 110, and a storage 120. The interface 101 performs data communication with a further network device, and performs transmission and reception of information that is used to generate a wavelength management table 121. The interface 101 is obtained, for example, by a network interface card (NIC) or the like. The interface 101 is a communication interface that is connected to a further network device through a network, and administers communication of information with the further network device.

The storage 120 includes the wavelength management table 121. The wavelength management table 121 is a table that indicates a usage status of wavelengths of the entire network. That is, the single wavelength management table 121 is provided for the entire network. The storage 120 corresponds to, for example, a semiconductor memory element such as a random access memory (RAM), a read only memory (ROM), or a flash memory, or a storage device such as a hard disk or an optical disk.

An example of a data structure of the wavelength management table 121 is described below with reference to FIG. 2. FIG. 2 is a diagram illustrating an example of the wavelength management table. As illustrated in the example of FIG. 2, the wavelength management table 121 associates a wavelength, a path type, an ending time, with the number of wavelength usages. Here, "wavelength" is an identification number that is uniquely assigned to each wavelength that is used in a main signal network. The main signal network is a network that includes a network device that performs transmission and reception of an optical signal that is mainly used at the time of data communication. In addition, "path type" indicates the type of a path that is assigned to each of the wavelengths. As "path type", there are three types of "definite term", "indefinite term", and "unused state". For example, when the path type is "definite term", it is indicated that a path in which the ending time has been set is assigned to "wavelength". The ending time is a date and time in which the configuration of the path is released. In addition, when the path type is "indefinite term", it is indicated that an indefinite term path in which the ending time is not set is assigned to "wavelength". When the path type is "unused state", it is indicated that a path is not assigned to "wavelength". The detail of the type of a path that is assigned to each of the wavelengths is described later.

Here, "ending time" indicates the ending date and time of a path the ending of which is the last, from among paths that has been set to the network. For example, the example of FIG. 2 indicates that the ending date and time of a path the ending of which is the last in a wavelength 1 is "12:00 on Mar. 20, 2013". In addition, the example of FIG. 2 indicates that the ending date and time of a path the ending of which is the last in a wavelength n−2 is "17:00 on May 2, 2014". In addition, it is assumed that "ending time" is "00:00 on 00/00/0000" when the path type is "indefinite term". In addition, it is assumed that "ending time" is "null" when the path type is "unused state".

In addition, "number of wavelength usages" indicates the number of paths that use each of the wavelengths. For example, in "number of wavelength usages", it is indicated that the wavelength 1 is used by a single path. In addition, it is indicated that a wavelength 2 is used by two paths. It is assumed that "number of wavelength usages" is set at "0" when the path type is "unused state".

Type of Path Assigned to Wavelength

Figure 3:
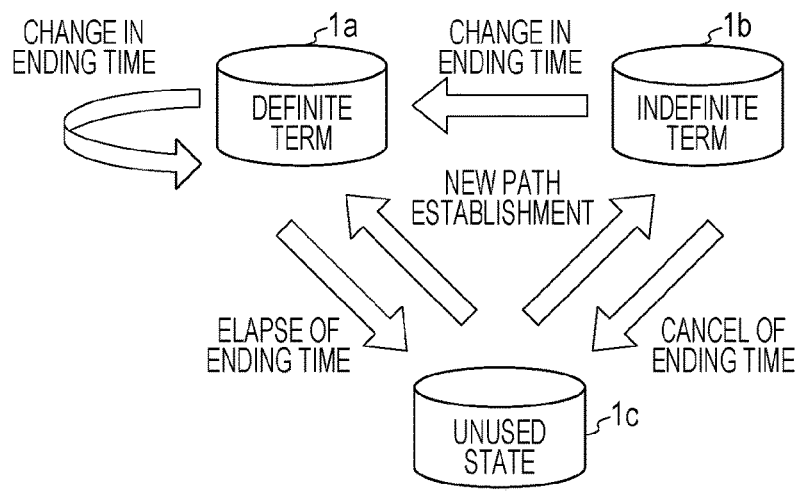
FIG. 3 is a diagram illustrating the type of a path that is assigned to each wavelength.

The type of a path that is assigned to each wavelength is described below with reference to FIG. 3. FIG. 3 is a diagram illustrating the type of a path that is assigned to each of the wavelengths. As illustrated in the example of FIG. 3, as the path type of each of the wavelengths, there are categories of a definite term $1a$, an indefinite term $1b$, and an unused state $1c$.

To each of the wavelengths, one of categories of the definite term $1a$, the indefinite term $1b$, and the unused state $1c$ is assigned. At the time of selection of a wavelength for a new path of "definite term", the wavelength-selective device 100 selects a wavelength from the category of the definite term $1a$. On the other hand, at the time of selection of a wavelength for a new path of "indefinite term", the wavelength-selective device 100 selects a wavelength from the category of the indefinite term $1b$. In addition, when there is no wavelength that is to be assigned to a new path in the definite term $1a$ or the indefinite term $1b$ at the time of selection of a wavelength for a new path of "definite term" or "indefinite term", the wavelength-selective device 100 selects a wavelength from the category of the unused state $1c$.

When the category of a wavelength corresponds to the definite term $1a$, the ending time of the wavelength is set to the wavelength management table 121. The ending time of the wavelength is indicated by a date and time in which the configuration of a path the ending time of which is the last from among paths that share the wavelength is released. That is, the ending time of the wavelength indicates a date and time in which the configuration of the wavelength is released by releasing the configurations of all of the paths that share the wavelength. The ending time of the wavelength is indicated merely by a date on which the configuration of a path the ending time of which is the last is released. In addition, the ending time of the wavelength may be changed as appropriate. For example, when the path the ending time of which is the last is cancelled, the ending time of the wavelength is changed to a date and time in which the configuration of a path the ending time of which is the second to last is released. The wavelength of the definite term $1a$, the ending time of which has come is changed to the category of the unused state $1c$. Furthermore, "the path is cancelled" means that the configuration of the path is released before the ending time.

In addition, when the category of a wavelength is the indefinite term $1b$, the ending time of the wavelength is not set. The wavelength of the indefinite term $1b$ may be changed to the category of the definite term $1a$ by setting the wavelength of the definite term $1a$ in regard to all of the paths that share the wavelength. In addition, the wavelength of the indefinite term $1b$ is changed to the category of the unused state is by all of the paths being cancelled.

In addition, when the category of a wavelength corresponds to the unused state $1c$, any path of the definite term $1a$ or the indefinite term $1b$ is not configured to the wavelength. The wavelength of the unused state $1c$ is changed to the category of the definite term $1a$ when a path of the definite term $1a$ is configured. In addition, the wavelength of the unused state $1c$ is changed to the category of the indefinite term $1b$ when a path of the indefinite term $1b$ is configured.

The wavelength-selective device 100 divides all wavelengths that are allowed to be used, into wavelengths related to the definite term $1a$ and wavelengths related to the indefinite term $1b$ at a certain ratio. For example, the wavelength-selective device 100 sets the wavelengths related to the definite term $1a$ at 70% and sets the wavelengths related to the indefinite term $1b$ at 30%. At the time of assignment of a wavelength to a path of the definite term $1a$, the wavelength-selective device 100 assigns a wavelength of the wavelengths related to the definite term $1a$, to the path. On the other hand, at the time of assignment of a wavelength to a path of the indefinite term 1b, the wavelength-selective device 100 assigns a wavelength of the wavelengths related to the indefinite term 1b, to the path.

At the time of assignment of a wavelength of the definite term 1a to a path, the wavelength-selective device 100 may assign a wavelength related to the indefinite term 1b to the path when there is no wavelength that is allowed to be assigned, in the wavelengths related to the definite term 1a. For example, when the wavelengths related to the definite term 1a, which are 70% of the whole wavelengths, are used for further paths, and the wavelength of the definite term 1a is not allowed to be assigned to a new path, the wavelength-selective device 100 may assign the wavelength of the wavelengths related to the indefinite term 1b, which are 30% of the whole wavelengths, to the new path. However, at the time of assignment of the wavelength of the indefinite term 1b to the new path, the wavelength-selective device 100 does not assign a wavelength related to the definite term 1a to the new path even when there is no wavelength that is allowed to be assigned, in the wavelengths related to the indefinite term 1b. As described above, the wavelength-selective device 100 may avoid depletion of wavelength resources of "definite term", by limiting assignment of a wavelength of "indefinite term".

Configuration of Controller

The controller 110 of the wavelength-selective device 100 includes a searching unit 111, a selection unit 112, a configuration unit 113, and an update unit 114. A function of the controller 110 may be achieved, for example, by executing a certain program through a central processing unit (CPU). In addition, the function of the controller 110 may be achieved, for example, by an integrated circuit such as an application specific integrated circuit (ASIC) or a field programmable gate array (FPGA).

The wavelength-selective device 100 includes the searching unit 111 that searches for paths that are allowed to be used in a network in which a plurality of communication devices communicates with each other, and the selection unit 112 that selects a wavelength to which the ending time has been set that is the closest to the ending time of a new path, from one or more wavelengths that are used by the found paths that are allowed to be used in the network. In addition, the wavelength-selective device 100 includes the configuration unit 113 that configures a path that uses the selected wavelength as a new path.

When a wavelength to which the ending time that is earlier than the ending time of the new path has been set is included in the one or more wavelengths that are used by the found paths that are allowed to be used in the network, the selection unit 112 selects a wavelength to which the ending time that is the closest to the ending time of the new path has been set, from the wavelengths.

The selection unit 112 selects a wavelength that is included in a first wavelength band, for a new path to which the ending time has been set, and selects a wavelength that is included in a second wavelength band, for a new path to which the ending time is not set. Each of the wavelengths of the definite term 1a is an example of the first wavelength band. In addition, each of the wavelengths of the indefinite term 1b is an example of the second wavelength band.

When there is no wavelength that is allowed to be selected in the first wavelength band, the selection unit 112 selects a wavelength that is included in the second wavelength band, for the new path to which the ending time has been set. A configuration of the controller 110 of the wavelength-selective device 100 is described below in detail.

The searching unit 111 is a processing unit that searches for a path that is allowed to be used in a network. When the searching unit 111 accepts a user command through the interface 101, the searching unit 111 performs path search by calculating a path with a path calculation device. The path calculation device is a device that calculates a path that is allowed to be configured as a new path in the network. When the new path corresponds to the definite term 1a, the searching unit 111 refers to the wavelength management table 121, and searches wavelengths that belong to the category of the definite term 1a, for the path. On the other hand, when the new path corresponds to the indefinite term 1b, the searching unit 111 searches wavelengths that belong to the category of the indefinite term 1b, for the path.

As a result of the path search, the searching unit 111 may find a plurality of paths. Here, the search of the plurality of paths indicates, for example, a case in which a single path that is allowed to use a plurality of wavelengths is found, a case in which a plurality of paths that is allowed to use a single wavelength is found, and a case in which a plurality of paths that is allow to use a plurality of wavelengths is found. The searching unit 111 outputs the found paths to the selection unit 112.

The selection unit 112 is a processing unit that selects a wavelength that is assigned to a new path from among the plurality of found paths. The selection unit 112 executes different processing depending on whether the new path belongs to the category of the definite term 1a or the category of the indefinite term 1b. The processing by the selection unit 112 in a case that the new path belongs to the category of the definite term 1a and in a case that the new path belongs to the category of the indefinite term 1b are described below respectively.

Figure 4:
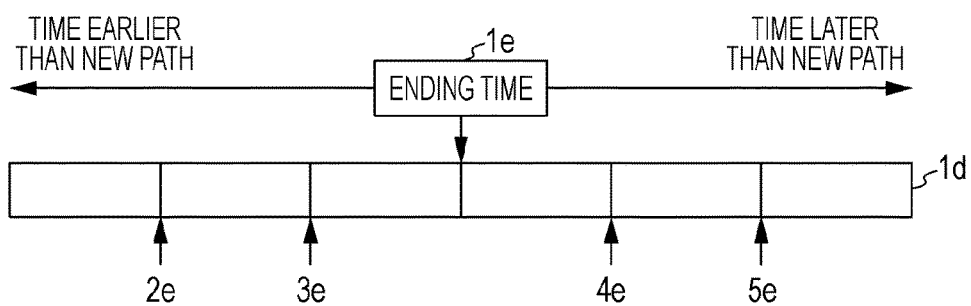
FIG. 4 is a diagram illustrating path-selective processing.

The processing that is executed by the selection unit 112 when the new path belongs to the category of the definite term 1a is described below with reference to FIG. 4. FIG. 4 is a diagram illustrating path-selective processing. A time axis 1d is a time axis that indicates the ending time of each wavelength. An ending time 1e is the ending time of a new path and is located at the center of the time axis 1d. In addition, ending times 2e to 5e are the ending times of the wavelengths. The ending times are arranged in the earliest order from the ending times 2e to 5e.

A wavelength to which the ending time that is earlier than the ending time of the new path has been set belongs to an area on the left side of the ending time 1e in the time axis 1d. For example, the wavelengths 2e and 3e belong to the area on the left side of the ending time 1e in the time axis 1d, so that the ending time of the new path is later than the ending times of the wavelengths 2e and 3e. On the other hand, a wavelength to which the ending time that is later than the ending time of the new path has been set belongs to an area on the right side of the ending time 1e in the time axis 1d. For example, the wavelengths 4e and 5e belong to the area on the right side of the ending time 1e in the time axis 1d, so that the ending time of the new path is earlier than the ending times of the wavelengths 4e and 5e.

The selection unit 112 refers to the wavelength management table 121, and, preferentially selects a wavelength to which the ending time that is earlier than and closer to the ending time 1e of the new path has been set. On the other hand, when there is no wavelength to which the ending time that is earlier than the ending time 1e of the new path has been set, the selection unit 112 preferentially selects a wavelength to which the ending time that is closer to the ending time 1e of the new path has been set, from among wavelengths to which the ending times that are later than the ending time 1e of the new path have been set.

For example, the selection unit 112 refers to the wavelength management table 121, and determines the priority levels of the wavelengths 2e to 5e as follows. The selection unit 112 selects the priority level of the wavelength 3e to which the ending time that is earlier than and the closest to the ending time 1e of the new path has been set, as the first level. In addition, the selection unit 112 selects the priority level of the wavelength 2e to which the ending time that is earlier than and the second closest to the ending time 1e of the new path, as the second level. In addition, the selection unit 112 selects, as the third level, the priority level of the wavelength 4e to which the ending time that is the closest to the ending time 1e of the new path has been set, from among the wavelengths to which the ending times that are later than the ending time 1e of the new path have been set. In addition, the selection unit 112 selects, as the fourth level, the priority level of the wavelength 5e to which the ending time that is the second closest to the ending time 1e of the new path has been set, from among the wavelengths to which the ending times that are later than the ending time 1e of the new path have been set.

In addition, when there is no wavelength that is allowed to be used in the wavelengths related to the definite term 1a, the selection unit 112 refers to the wavelength management table 121, and selects the shortest wavelength that is allowed to be used in the wavelengths related to the unused state 1c. In addition, when there is no wavelength that is allowed to be used in the wavelengths related to the definite term 1a and the wavelengths related to the unused state 1c, the selection unit 112 may select a wavelength in the wavelengths related to the indefinite term 1b.

The processing is executed by the selection unit 112 when the new path belongs to the category of the indefinite term 1b is described below. The selection unit 112 refers to the wavelength management table 121, and selects a path of the shortest wavelength in the wavelengths related to the indefinite term 1b. In addition, when there is no wavelength that is allowed to be used in the wavelengths related to the indefinite term 1b, the selection unit 112 selects the shortest wavelength that is allowed to be used in the wavelengths related to the unused state 1c.

As described above, when the selection unit 112 configures a new path of the definite term 1a, the selection unit 112 preferentially selects a wavelength the ending time of which is closer to the ending time 1e of the new path, so that the configurations of paths that share the wavelength are released at approximately the same time, and the configuration of the wavelength is efficiently released. Therefore, the wavelength resource may be recycled in a short time period, so that the wavelength resource may be efficiently used.

The configuration unit 113 is a processing unit that configures a path that uses the wavelength that has been selected by the selection unit 112, as a new path. When a plurality of paths is found that uses the wavelength that has been selected by the selection unit 112, the configuration unit 113 configures the shortest path in the found paths, as the new path. In addition, when a single path is found that uses the wavelength that has been selected by the selection unit 112, the configuration unit 113 configures the found path as the new path.

In addition, when the ending time of the path that has been configured in the network has come, or when the configuration of the path is cancelled, the configuration unit 113 executes processing of releasing the configuration of the path. When the configurations of all of the paths that share the wavelength of the definite term 1a or the indefinite term 1b are released, the configuration unit 113 releases the configuration of the shared wavelength, and changes the wavelength to the category of the unused state 1c.

The update unit 114 is a processing unit that updates the wavelength management table 121. The update unit 114 updates the wavelength management table 121 for example when a new path is configured, when the ending time of one of paths that shares a wavelength has come, or when one of paths that share a wavelength is cancelled.

As a first case, when a new path is configured, the update unit 114 adds "1" to the number of wavelength usages of the selected wavelength. In addition, when the ending time of the new path is later than the ending time of the selected wavelength, the update unit 114 updates the ending time of the wavelength to the ending time of the new path. In addition, when the update unit 114 assigns a path of the definite term 1a or the indefinite term 1b, to a wavelength that belongs to the category of the unused state 1c, the update unit 114 updates the category of the wavelength to the definite term 1a or the indefinite term 1b.

As a second case, when the ending time of one of paths that share a wavelength has come, the update unit 114 subtracts "1" from the number of wavelength usages. In addition, when the number of wavelength usages is 0, the update unit 114 updates the path type to "unused state 1c", updates the ending time to "null", and updates the number of wavelength usages to "0".

As a third case, when one of paths that share a wavelength is cancelled, the update unit 114 subtracts "1" from the number of wavelength usages. In addition, when the number of wavelength usages is 0, the update unit 114 updates the path type to "unused state 1c", updates the ending time to "null", and updates the number of wavelength usages to "0".

In addition, when the ending time of the cancelled path is the ending time of the wavelength, the update unit 114 sets a path having the ending time that is the second to last, from among paths that share the wavelength, as the ending time of the wavelength.

Example of Wavelength-Selective Processing

Figure 5:
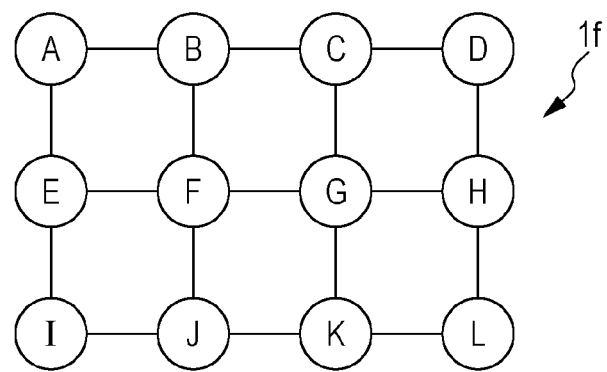
FIG. 5 is a diagram illustrating an example of a network configuration.

Path configuration is described below with reference to FIGS. 5 to 8. FIG. 5 is a diagram illustrating an example of a network configuration. Here, "A" to "L" of a network if illustrated in the example of FIG. 5 respectively indicate network devices. The network devices A to L are connected to so as to communicate with each other, and form a network.

FIG. 6 is a first diagram illustrating path configuration. Here, "λ1" to "λ5" that are listed in the vertical direction of a table 1g respectively indicates wavelengths. The wavelengths are listed in order of the shortest wavelengths from λ1, λ2, λ3, λ4, and λ5. The signs of the alphabets A to L, which are listed in the horizontal direction of the table 1g, indicate respectively sections between the network devices. For example, "AB" indicates a section between the network devices A and B illustrated in the example of FIG. 5. In addition, "CD" indicates a section between the network devices C and D illustrated in the example of FIG. 5.

In addition, #1 to #6 in the table 1g respectively indicates new paths that are configured in the network. The paths #1 and #4 belong to the category of the indefinite term 1b. The paths #2 and #5 belong to the category of the definite term 1a, and are planned to be used in a long term. The paths #3 and #6 belong to the category of the definite term 1a, and are planned to be used in a short term.

The wavelength-selective device 100 configures paths in order of the paths #1, #2, #3, #4, #5, and #6. In this case, a wavelength that is assigned to each of the paths is described below. The path #1 corresponds to "A-B-C-G-K-L". The wavelength-selective device 100 selects the wavelength λ1 because the wavelength λ1 is not used in each of the sections. As a result, "#1" is stored in the squares of the sections AB, BC, CG, GK, and KL in the row of "λ1" of the table 1g. The path #2 corresponds to "E-A-B-C-D-H". The wavelength-selective device 100 selects the wavelength λ2 because the path of the indefinite term 1b is configured to the wavelength λ1. As a result, "#2" is stored in the squares of the sections AB, BC, CD, AE, and DH in the row of "λ2" of the table 1g.

The path #3 corresponds to "D-H-L". The wavelength-selective device 100 selects the wavelength λ3 because the path of the indefinite term 1b is configured to the wavelength λ1, and the wavelength λ2 is used for the section DH. As a result, "#3" is stored in the squares of the sections DH and HL in the row of "λ3" of the table 1g. The path #4 corresponds to "D-H-G-F-E-I". The wavelength-selective device 100 selects the wavelength λ1 because the wavelength λ1 belongs to the category of the indefinite term 1b, and the wavelength λ1 is not used for each of the sections of "D-H-G-F-E-I". As a result, "#4" is stored in the squares of the sections DH, EF, FG, GH, and EI in the row of "λ1" of the table 1g.

The path #5 is "B-F-J-K". The wavelength-selective device 100 selects the wavelength λ2 because the wavelength λ1 belongs to the category of the indefinite term 1b, and the wavelength λ2 is not used for each of the sections of "B-F-J-K". As a result, "#5" is stored in the squares of the sections BF, FJ, and JK in the row of "λ2" of the table 1g. The path #6 is "I-J-K-L". The wavelength-selective device 100 selects the wavelength λ3 because the wavelength λ1 belongs to the category of the indefinite term 1b, and the wavelength λ2 is used in the section JK. As a result, "#6" is stored in the squares of the sections IJ, JK, and KL in the row of "λ3" of the table 1g.

Figure 7:
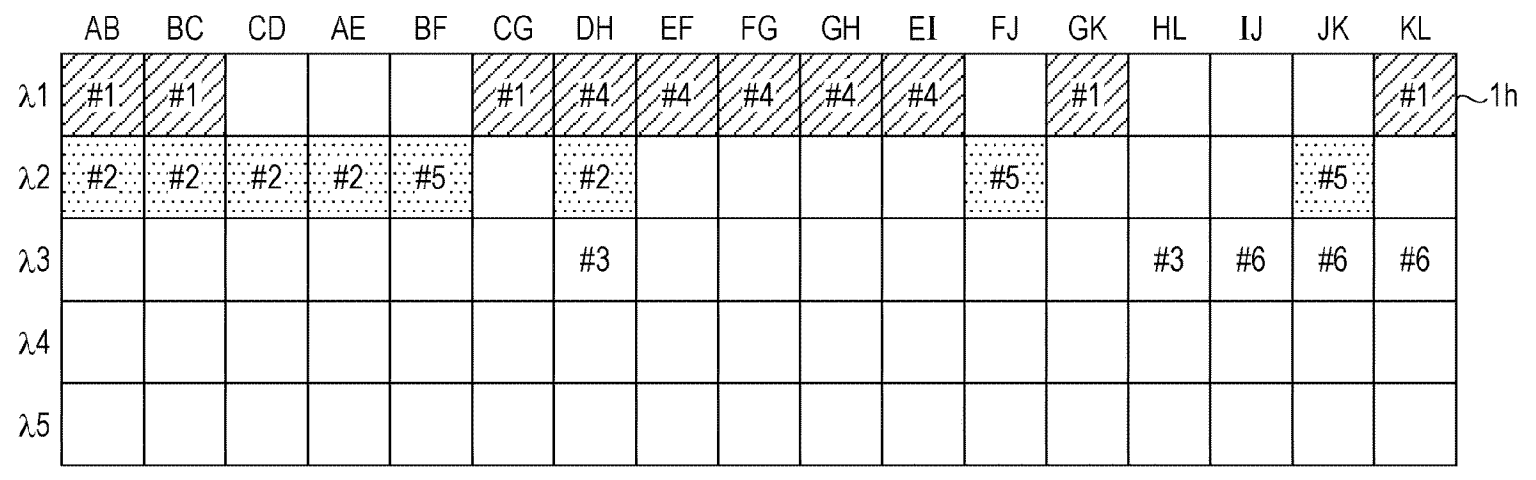

FIG. 7 is a second diagram illustrating the path configuration. As illustrated in a table 1h of FIG. 7, the ending times of the paths #3 and #6 have come, so that the configuration of the sections DH, HL, IJ, JK, and KL in the row of the wavelength λ3 are released. The configurations of all of the sections of the wavelength λ3 are released, so that the configuration of the wavelength λ3 is released.

FIG. 8 is a third diagram illustrating the path configuration. As illustrated in a table 1i of FIG. 8, when a path #7 of the indefinite term 1b of "A-E-I-J-K-L-H-D" is configured, the wavelength-selective device 100 selects the wavelength λ3 because the wavelength λ1 is used in the sections DH and KL, and the wavelength λ2 belongs to the category of the definite term 1a. As described above, the wavelength-selective device 100 may recycle the wavelength λ3 for the path #7 because the configurations of the paths "#3" and "#6" that share the wavelength λ3 and the ending times of which are close to each other are released.

The wavelength-selective device 100 may utilize a wavelength resource efficiently because efficient recycle of a wavelength is performed by selecting a wavelength so that paths the ending times of which are close to each other share an identical wavelength.

Example of Wavelength-Selective Processing of Reference Example 1

Path configuration by a wavelength-selective device 100 according to a reference example 1 is described below with reference to FIGS. 9 and 10. FIG. 9 is a first diagram illustrating the path configuration in the reference example 1. Here, "λ1" to "λ5" that are listed in the vertical direction of a table 1j respectively indicates wavelengths. The wavelengths are listed in order of the shortest wavelength from λ1, λ2, λ3, λ4, and λ5. The signs of the alphabets A to L, which are listed in the horizontal direction of the table 1j, respectively indicate sections between network devices. In addition, #1 to #6 in the table 1j respectively indicate new paths that are configured in the network. In the reference example 1, to the paths #1 to #6, the ending times are not set. That is, in the reference example 1, the paths #1 to #6 correspond to the category of the indefinite term 1b. The example is similar to those of FIGS. 5 to 8 in that the usage time periods of the paths #1 and #4 are indefinite, and the paths #2 and #5 are planned to be used in a long term, and the paths #3 and #6 are planned to be used in a short term.

The wavelength-selective device 100 according to the reference example 1 configures paths in order from the paths #1, #2, #3, #4, #5, and #6. In this case, as illustrated in the table 1j of FIG. 9, the paths #1, #3 and #5 share the wavelength λ1, the paths #2 and #6 share the wavelength λ2, and the path #4 uses the wavelength λ3. In the wavelength λ1, the path #1 of the indefinite term and the paths #3 and #5 of the definite term are mixed. In addition, in the wavelength λ2, the path #2 of the late ending time, and path #6 of the early ending time are mixed. In addition, in the wavelength λ3, the path #4 of the indefinite term is included.

FIG. 10 is a second diagram illustrating the path configuration in the reference example 1. As illustrated in the example of FIG. 10, after the ending time of the path #3 has come, the configurations of the sections DH and HL of the wavelength λ1 are released. In addition, after the ending time of the path #6 has come, the configurations of the sections IJ, JK, and KL of the wavelength λ2 are released. When the path #7 of "A-E-I-J-K-L-H-D" is configured after the ending times of the paths #3 and #6 have come, the wavelength-selective device 100 selects the wavelength λ4 because the section of the path #7 is overlapped with any one of the sections of the wavelengths λ1 to λ3. As described above, in the reference example 1, even when the ending times of the paths #3 and #6 come, the further paths shares the wavelengths λ1 to λ3, and the configurations of the wavelengths λ1 to λ3 are not released, so that the wavelength-selective device 100 selects the unused wavelength λ4 because.

Processing Flow of Wavelength Selection

Figure 11:
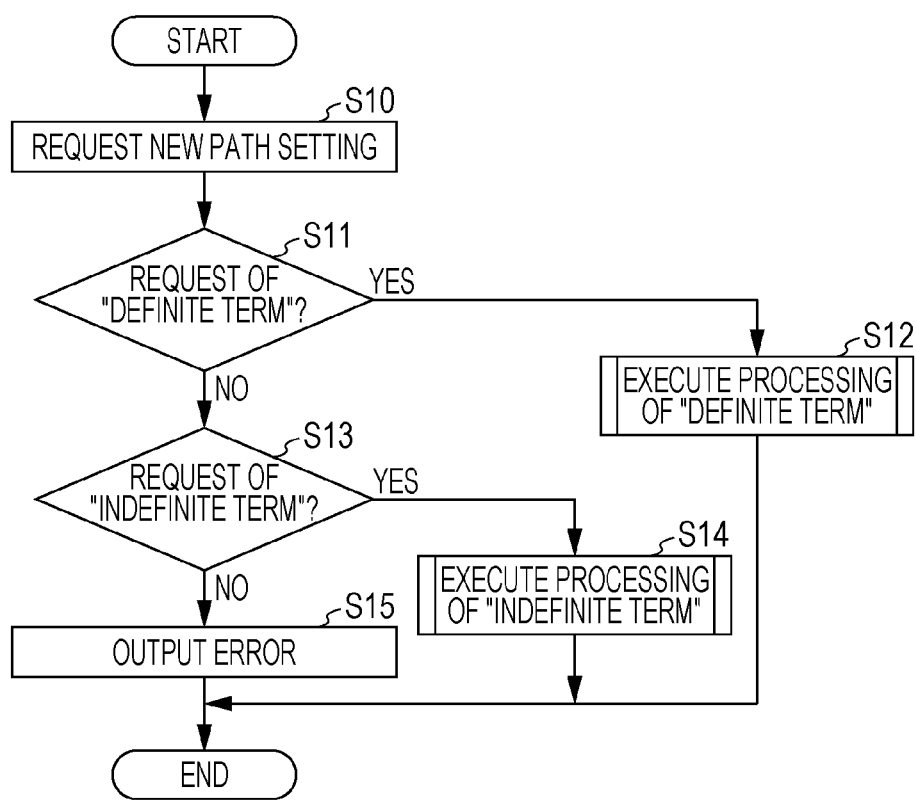
FIG. 11 is a first flow diagram illustrating an example of a flow of wavelength selection.

A processing flow of wavelength selection is described below with reference to FIGS. 11 to 13. FIG. 11 is a first flow diagram illustrating an example of a flow of the wavelength selection. FIG. 11 illustrates a processing flow of the entire wavelength processing. As illustrated in the example of FIG. 11, the wavelength-selective device 100 accepts a configuration request of a new path (Operation S10). The wavelength-selective device 100 determines whether or not the new path corresponds to a request of the definite term 1a (Operation S11). When the new path corresponds to a request of the definite term 1a (Yes in Operation S11), the wavelength-selective device 100 executes processing of the definite term (Operation S12). On the other hand, when the new path does not correspond to a request of the definite term (No in Operation S11), in the wavelength-selective device 100, the flow proceeds to processing of Operation S13.

The wavelength-selective device 100 determines whether or not the new path corresponds to a request of the indefinite term 1b (Operation S13). When the new path corresponds to a request of the indefinite term 1b (Yes in Operation S13), the wavelength-selective device 100 executes processing of the indefinite term 1b (Operation S14). On the other hand, when the new path does not correspond to a request of the indefinite term (No in Operation S13), the wavelength-selective device 100 outputs an error (Operation S15). At the time of output of the error, the wavelength-selective device 100 may output the error in a pop-up displayed in a monitor of the user terminal.

Figure 12:
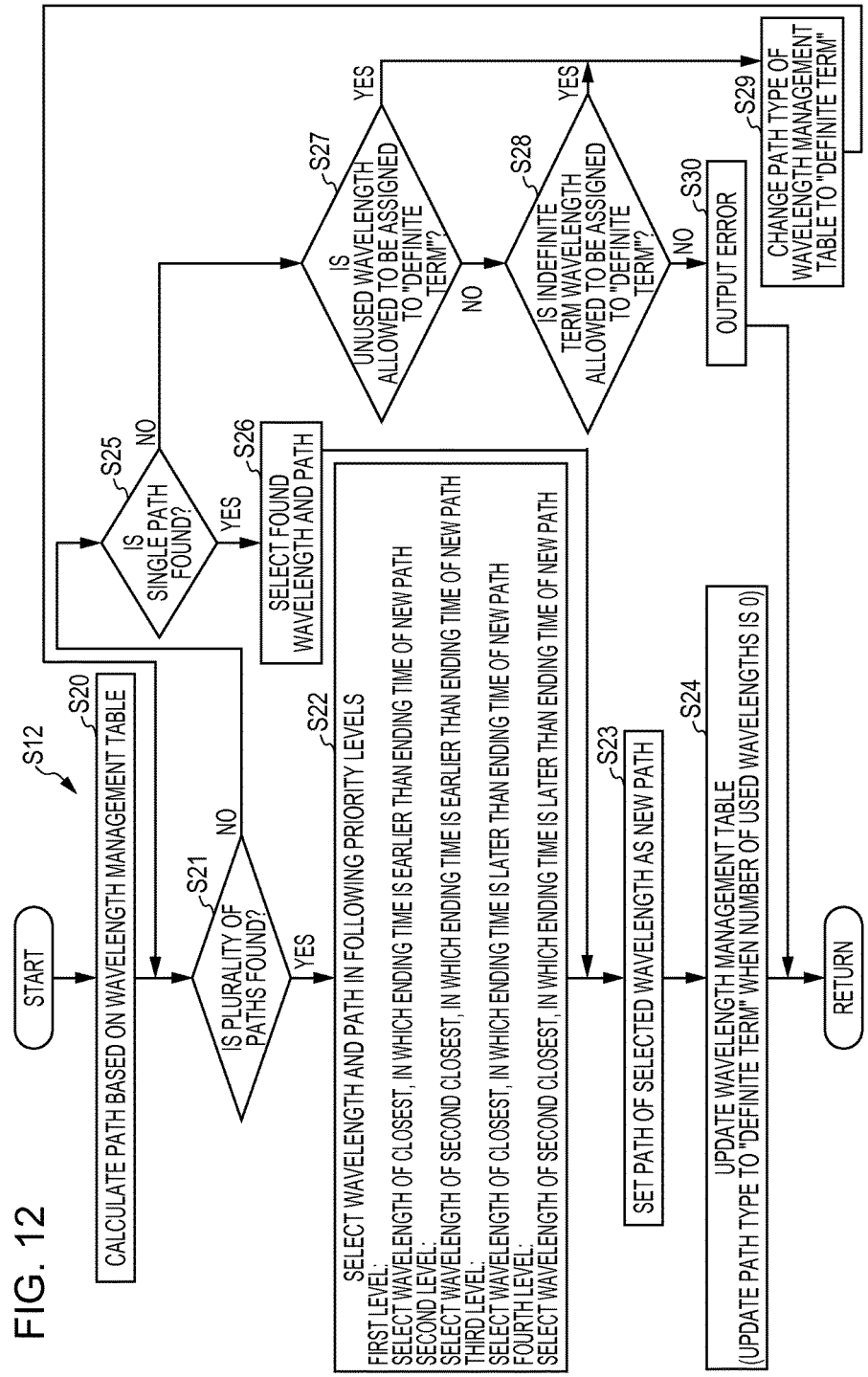
FIG. 12 is a second flow diagram illustrating the example of the flow of the wavelength selection.

FIG. 12 is a second flow diagram illustrating the example of the flow of the wavelength selection. FIG. 12 illustrates a flow that corresponds to the processing of "definite term" in Operation S12. The searching unit 111 calculates a path based on the wavelength management table 121 (Operation S20). The selection unit 112 determines whether or not a plurality of paths is found (Operation S21). When a plurality of paths is found (Yes in Operation S21), the selection unit 112 selects the priority level of a wavelength of the closest to the ending time of the new path, in which the ending time is earlier than the ending time of the new path, as the first level, and selects the priority level of a wavelength of the second closest to the ending time of the new path, in which the ending time is earlier than the ending time of the new path, as the second level (Operation S22). In addition, the selection unit 112 selects the priority level of a wavelength of the closest to the ending time of the new path, in which the ending time is later than the ending time of the new path, as the third level, and selects the priority level of a wavelength of the second closest to the ending time of the new path and in which the ending time is later than the ending time of the new path, as the fourth level (Operation S22). The configuration unit 113 configures the path of the selected wavelength as the new path (Operation S23).

The update unit 114 updates the path type, the ending time, and the number of wavelength usages in the wavelength management table 121 (Operation S24). For example, when the number of wavelength usages is one or more, the update unit 114 adds "1" to the number of wavelength usages. In addition, when the number of wavelength usages is "0", the update unit 114 updates the path type to "definite term" (Operation S24). When a wavelength in which the ending time is later than the ending time of the new path is selected, the update unit 114 updates the ending time to the ending time of the new path.

When a plurality of paths is not found in Operation S21 (No in Operation S21), the selection unit 112 determines whether or not a single path is found (Operation S25). When a single path is found (Yes in Operation S25), the selection unit 112 selects the found wavelength and path (Operation S26), the flow proceeds to processing of Operation S23. On the other hand, when any path is not found (No in Operation S25), in the selection unit 112, the flow proceeds to processing of Operation S27.

The selection unit 112 determines whether or not a wavelength of the unused state 1c is allowed to be assigned to the definite term 1a (Operation S27). When the wavelength of the unused state 1c is allowed to be assigned to the definite term 1a (Yes in Operation S27), the selection unit 112 changes the path type of the wavelength management table 121 from the unused state 1s to the definite term 1a (Operation S29). After that, in the searching unit 111, the flow returns to the processing of Operation S20. On the other hand, when the wavelength of the unused state 1c is not allowed to be assigned to the definite term 1a (No in Operation S27), in the selection unit 112, the flow proceeds to processing of Operation S28.

The selection unit 112 determines whether or not a wavelength of the indefinite term 1b is allowed to be assigned to the definite term 1a (Operation S28). When the wavelength of the indefinite term 1b is allowed to be assigned to the definite term 1a (Yes in Operation S28), the selection unit 112 changes the path type of the wavelength management table 121, from the indefinite term 1b to the definite term 1a (Operation S29). After that, in the searching unit 111, the flow returns to the processing of Operation S21. On the other hand, when the wavelength of the indefinite term 1b is not allowed to be assigned to the definite term 1a (No in Operation S28), the selection unit 112 performs output of an error (Operation S30).

Figure 13:
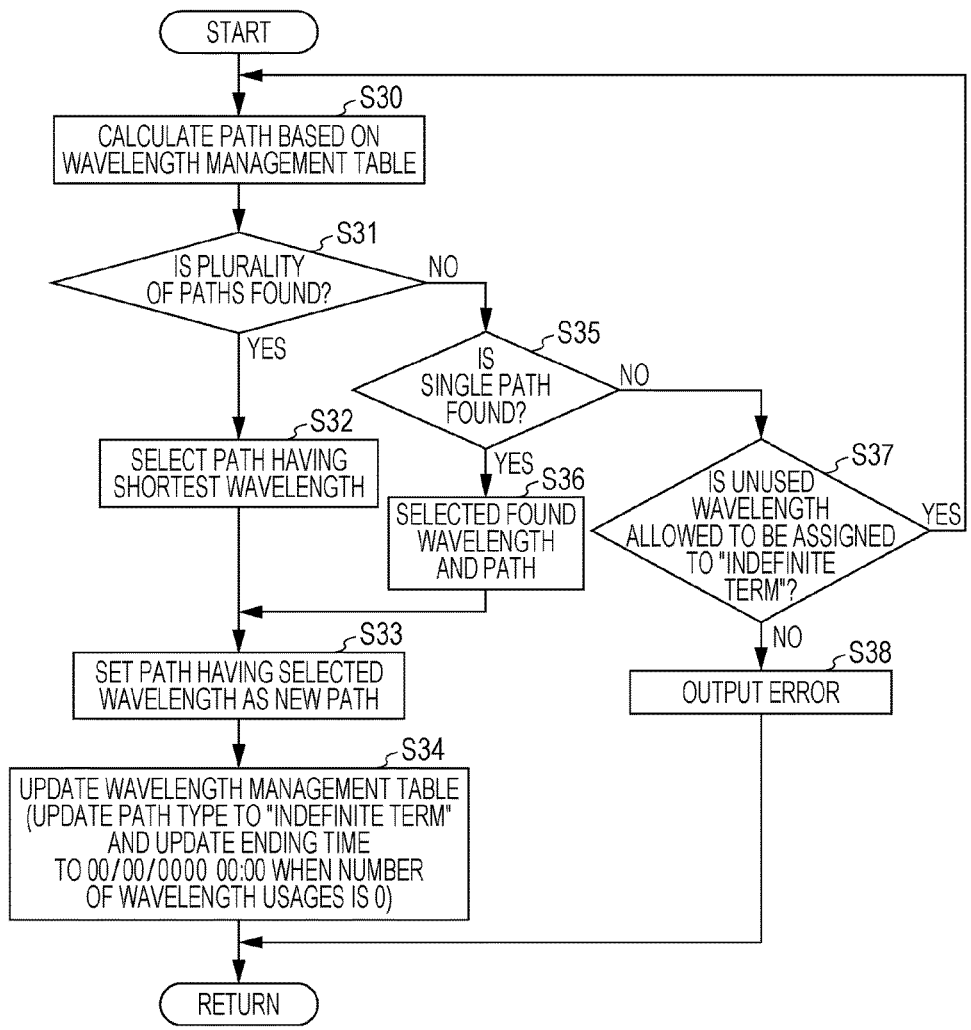
FIG. 13 is a third flow diagram illustrating the example of the flow of the wavelength selection.

FIG. 13 is a third flow diagram illustrating the example of the flow of the wavelength selection. FIG. 13 illustrates a flow that corresponds to the processing of "indefinite term" in Operation S14. The searching unit 111 calculates a path based on the wavelength management table 121 of "indefinite term" (Operation S30). The selection unit 112 determines whether or not a plurality of paths is found (Operation S31). When a plurality of paths is found (Yes in Operation S31), the selection unit 112 selects a path having the shortest wavelength (Operation S32). The configuration unit 113 sets the path of the selected wavelength as a new path (Operation S33).

The update unit 114 updates the path type, the ending time, and the number of wavelength usages of the wavelength management table 121 (Operation S34). For example, when the number of wavelength usages is one or more, the update unit 114 adds "1" to the number of wavelength usages. In addition, when the number of wavelength usages is "0", the update unit 114 updates the path type to "indefinite term", updates the ending time to "00:00 on 00/00/0000", and adds "1" to the number of wavelength usages (Operation S34).

When a plurality of paths is not found in Operation S31 (No in Operation S31), the selection unit 112 determines whether or not a single path has been found (Operation S35). When a single path has been found (Yes in Operation S35), the selection unit 112 selects the found wavelength and path (Operation S36). On the other hand, when any path is not found (No in Operation S35), in the selection unit 112, the flow proceeds to processing of Operation S37.

The selection unit 112 determines whether or not the wavelength of the unused state 1c is allowed to be assigned to the indefinite term 1b (Operation S37). When the wavelength of the unused state 1c is allowed to be assigned to the indefinite term 1b (Yes in Operation S37), the selection unit 112 assigns the wavelength of the unused state is to the indefinite term 1b, and the flow returns to the processing of Operation S30. On the other hand, when the wavelength of the unused state 1c is not allowed to be assigned to the indefinite term 1b (No in Operation S37), the selection unit 112 performs output of an error (Operation S38).

Update of Wavelength Management Table

Figure 14:
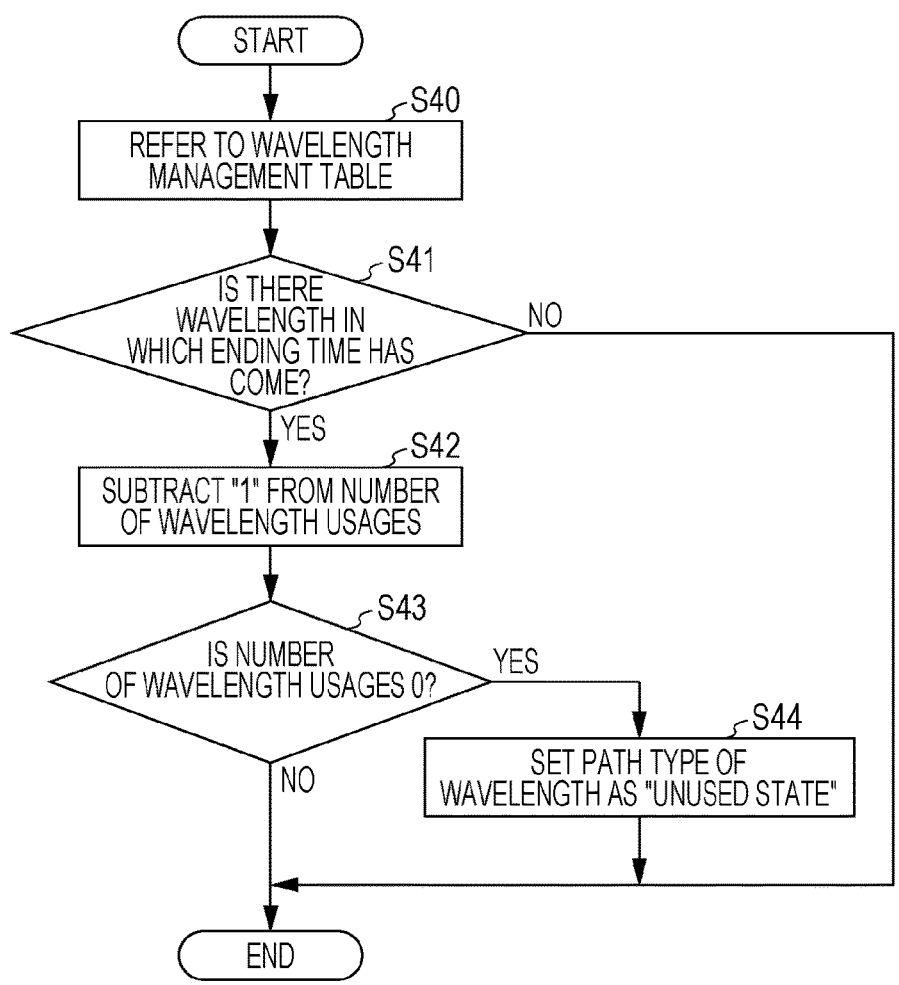
FIG. 14 is a flow diagram illustrating a first example of a flow of update processing.

A flow of update processing of the wavelength management table 121 when the configuration of a path is released is described below with reference to FIGS. 14 and 15. FIG. 14 is a flow diagram illustrating a first example of the flow of the update processing. The example of FIG. 14 illustrates processing when the ending time of the configured path has come. The update unit 114 refers to the wavelength management table 121 after a certain time period has come (Operation S40). The update unit 114 determines whether or not there is a wavelength in which the ending time has come, from among the wavelengths of the wavelength management table 121 (Operation S41). When there is no wavelength in which the ending time has come (No in Operation S41), in the update unit 114, the processing ends. On the other hand, when there is a wavelength in which the ending time has come (Yes in Operation S41), the update unit 114 subtracts "1" from the number of wavelength usages (Operation S42).

After that, the update unit 114 determines whether or not the number of wavelength usages has become 0 (Operation S43). When the number of wavelength usages has become 0 (Yes in Operation S43), the update unit 114 sets the path type of the wavelength to the unused state is (Operation S44). On the other hand, when the number of wavelength usages is one or more (No in Operation S43), in the update unit 114, the processing ends.

Figure 15:
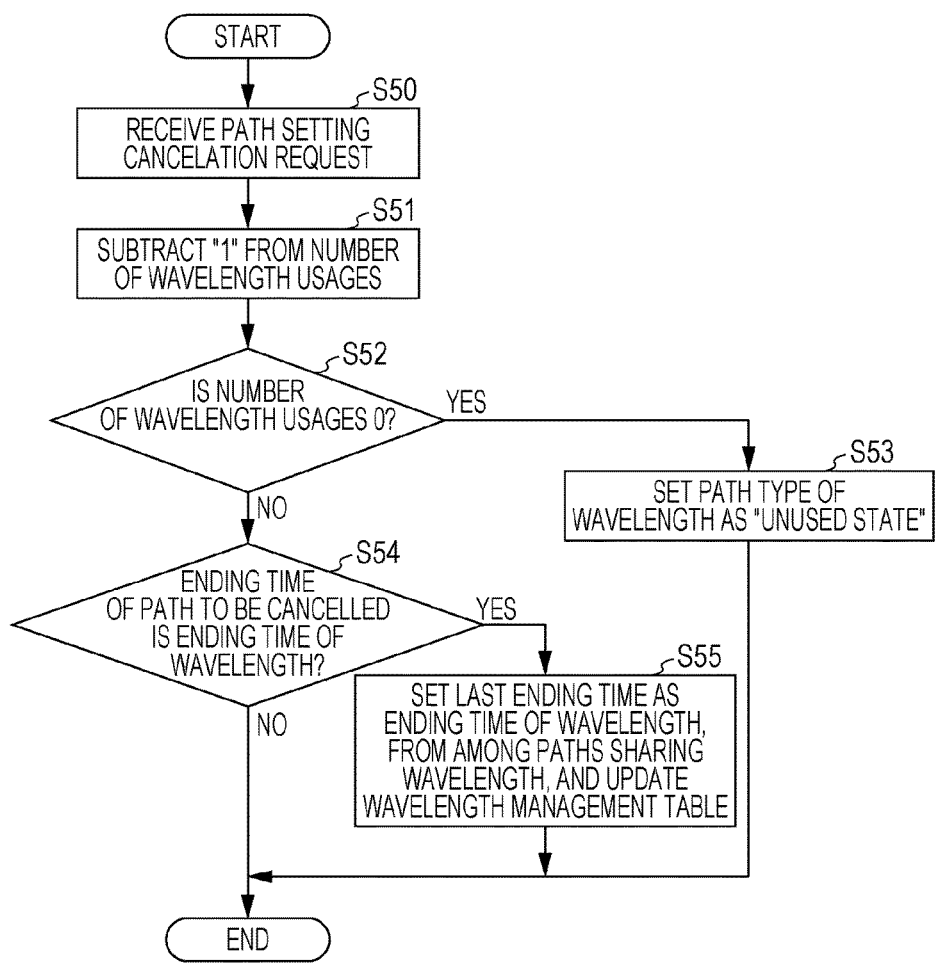
FIG. 15 is a flow diagram illustrating a second example of the flow of the update processing.

FIG. 15 is a flow diagram illustrating a second example of the flow of the update processing. The example of FIG. 15 illustrates processing when the configured path has been cancelled. The update unit 114 receives a path configuration cancellation request (Operation S50). The update unit 114 subtracts "1" from the number of wavelength usages of a wavelength that is shared by the cancelled path, in the wavelength management table 121 (Operation S51). The update unit 114 determines whether or not the number of wavelength usages has become 0 (Operation S52). When the number of wavelength usages has become 0 (Yes in Operation S52), the update unit 114 sets the path type of the wavelength as the unused state is (Operation S53). On the other hand, when the number of wavelength usages is not 0 (No in Operation S52), in the update unit 114, the flow proceeds to processing of Operation S54.

The update unit 114 determines whether or not the ending time of the cancelled path is the ending time of the wavelength (Operation S54). When the ending time of the cancelled path is the ending time of the wavelength (Yes in Operation S54), the update unit 114 sets the last ending time of a path, from among the paths that share the wavelength, as the ending time of the wavelength, and updates the wavelength management table 121 (Operation S55). When the ending time of the cancelled path is not the ending time of the wavelength (No in Operation S54), in the update unit 114, the processing ends.

Application Example to System

Figure 16:
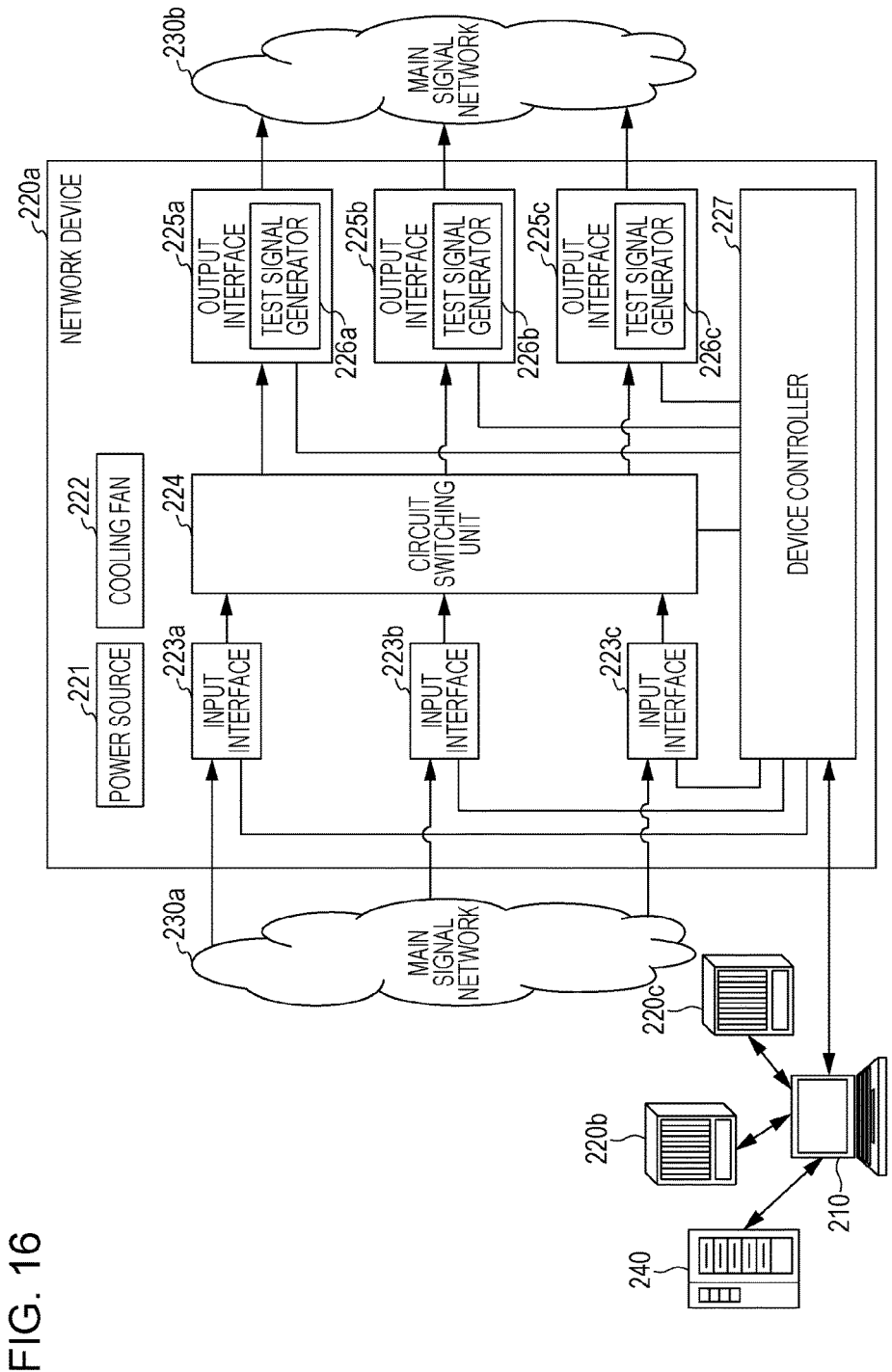
FIG. 16 is a diagram illustrating a first example of a system configuration.

An application example of the wavelength-selective device 100 to a system is described below with reference to FIGS. 16 to 18. FIG. 16 is a first example of a system configuration. As illustrated in the example of FIG. 16, main signal networks 230a and 230b are connected to each other through a network device 220a. That is, the network device 220a is a part of a plurality of network devices that is included in the main signal networks.

The network device 220a includes a power source 221, a cooling fan 222, input interfaces 223a to 223c, a circuit switching unit 224, output interfaces 225a to 225c, test signal generators 226a to 226c, and a device controller 227. The power source 221 supplies electric power to the network device 220a. The cooling fan 222 cools the device by taking external air into the device. Each of the input interfaces 223a to 223c receives a test signal that has been transmitted from a further network device, and inputs the test signal to the circuit switching unit 224. The test signal is a signal that includes information of each path that has been configured in the main signal network 230. The circuit switching unit 224 outputs data that is used to perform transmission of a test signal that is to be transmitted to a further network device based on the input test signal, to each of the output interfaces 225a to 225c. Each of the test signal generators 226a to 226c generates a test signal based on the output data. The output interfaces 225a to 225c respectively transmit the test signals that are generated by the test signal generators 226a to 226c, to further network devices. Each of the network devices 220b and 220c has a configuration that is similar to that of the network device 220a.

The device controller 227 transmits information on path calculation based on the test signal that has been input to the circuit switching unit 224, to an element management system (EMS)/network management system (NMS) 210. A function of the device controller may be achieved, for example, by executing a certain program through the CPU. In the example of FIG. 16, the EMS/NMS 210 is a device that functions as the wavelength-selective device 100, and selects a new path. The EMS/NMS 210 is, for example, a personal computer or a workstation, and accepts a command that has been input from the user.

The EMS/NMS 210 performs path selection as follows. First, the EMS/NMS 210 outputs information on path calculation, which has been transmitted from each of the network device 220a to 220c, to the path calculation device 240. The path calculation device 240 calculates a path that is allowed to be configured as a new path. The path calculation device 240 outputs information on the new path, to the EMS/NMS 210. The EMS/NMS 210 selects a path as the new path, from one or more paths that are allowed to be configured as the new path, based on the output information on the new path. After that, the EMS/NMS 210 configures the selected path by communicating with the device controller 227 of each of the network devices 220a to 220c.

Figure 17:
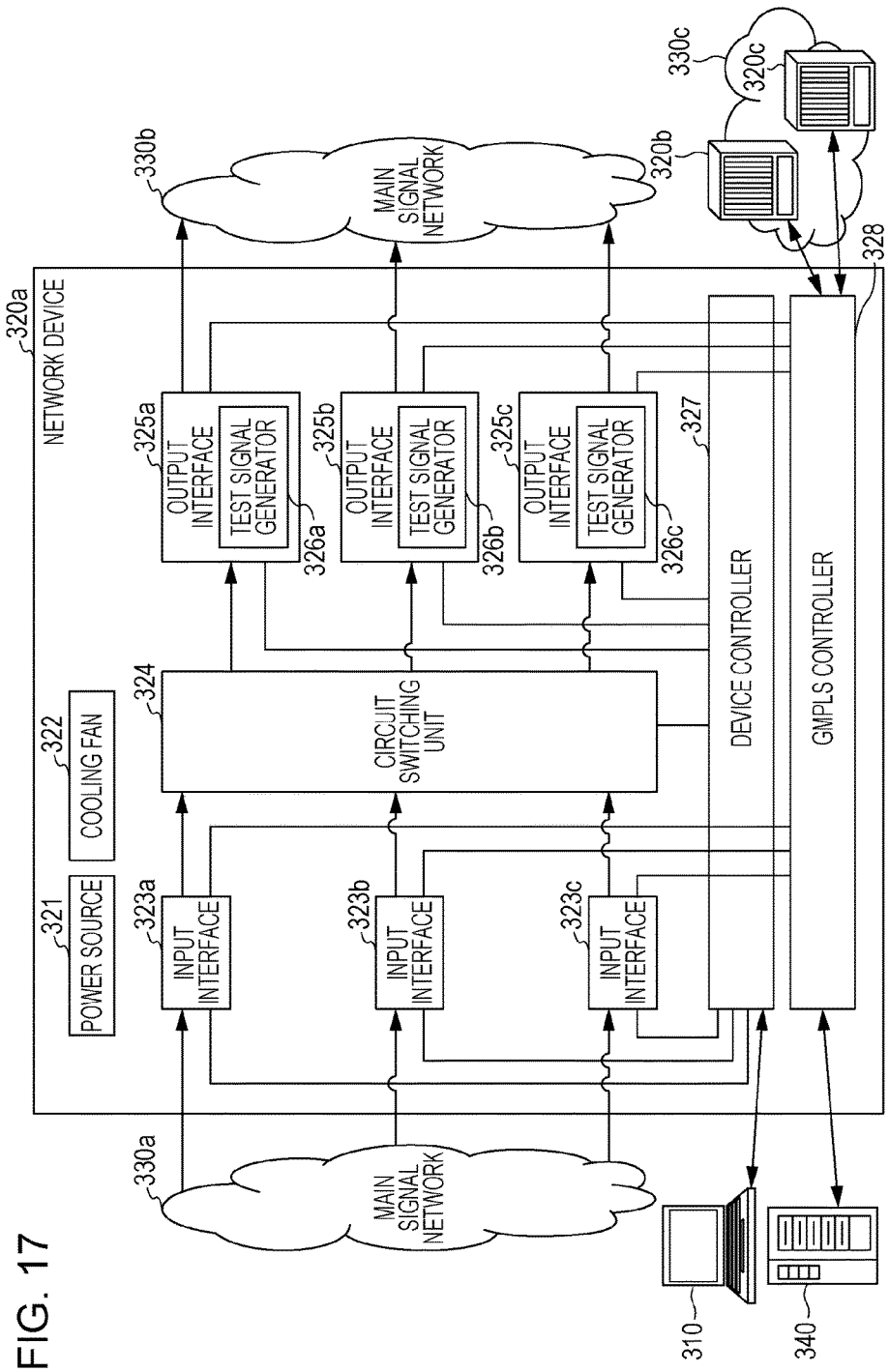
FIG. 17 is a diagram illustrating a second example of the system configuration.

FIG. 17 is a diagram illustrating a second example of the system configuration. As illustrated in the example of FIG. 17, main signal networks 330a and 330b are connected to each other through a network device 320a. An EMS/NMS 310 accepts a command that has been input from the user, and outputs the received command to a device controller 327.

The network device 320a includes a power source 321, a cooling fan 322, input interfaces 323a to 323c, a circuit switching unit 324, output interfaces 325a to 325c, test signal generators 326a to 326c, the device controller 327, and a GMPLS controller 328. Network devices 320b and 320c are included in a main signal network 330c. Each of the network devices 320b and 320c transmits information on path calculation, to the GMPLS controller 328, using a GMPLS protocol. In the unit having a configuration that is similar to that of the network device 220 in FIG. 16, the last two digits of the reference numeral are matched with those of the unit in the network device 220 in FIG. 16, and the description is omitted as appropriate.

In the example of FIG. 17, the GMPLS controller 328 is a processing unit that functions as the wavelength-selective device 100, and selects a new path. The GMPLS controller 328 performs path selection as follows. First, the GMPLS controller 328 obtains information on path calculation from each of the network device 320a to 320c, and outputs the information on the path calculation, to a path calculation device 340. The path calculation device 340 outputs information on a new path, to the GMPLS controller 328. The GMPLS controller 328 selects a path as the new path, from one or more paths that are allowed to be configured as the new paths, based on the output information on the new path. The GMPLS controller 328 configures the path between the network device 320a and a further network device 320 that belongs to the selected path. Similar to the network device 320a, the GMPLS controller 328 that is included in each of the network devices 320 configures a path between the network device 320 and a further network device 320 that belongs to the selected path.

In the example of FIG. 17, the wavelength management table 121 may be managed by each of the network devices 320. When each of the network devices 320 manages the wavelength management table 121, the consistency of the wavelength management table 121 is kept when the network devices 320 communicate with each other. In addition, a server that is connected to each of the network devices so as to communicate with the network device may manage the wavelength management table 121.

Figure 18:
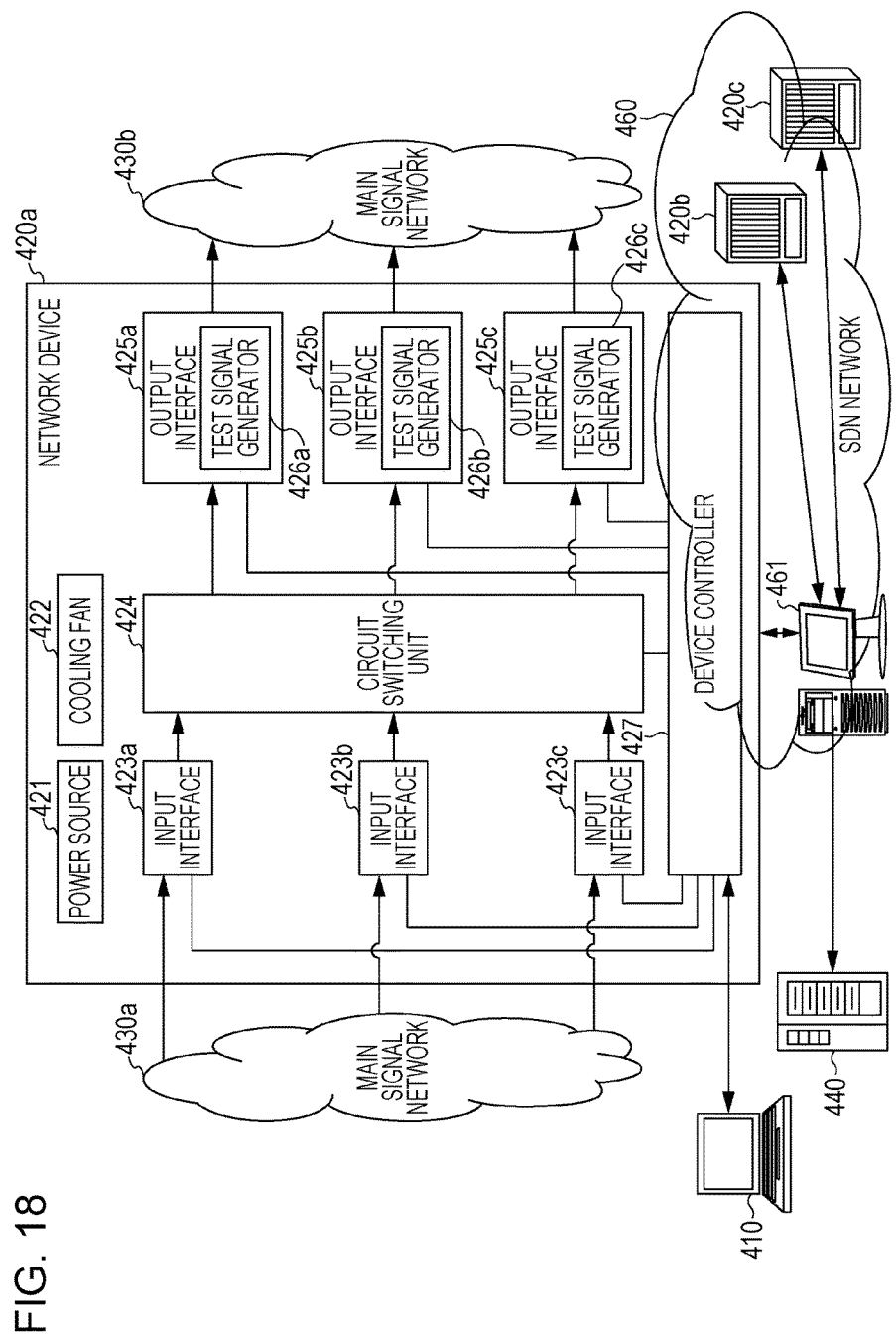
FIG. 18 is a diagram illustrating a third example of the system configuration.

FIG. 18 is a diagram illustrating a third example of the system configuration. As illustrated in the example of FIG. 18, main signal networks 430a and 430b are connected to each other through a network device 420a. An EMS/NMS 410 receives a command that has been input from the user, and outputs the received command to a device controller 427.

The network device 420a includes a power source 421, a cooling fan 422, input interfaces 423a to 423c, a circuit switching unit 424, output interfaces 425a to 425c, test signal generators 426a to 426c, and the device controller 427. Network devices 420b and 420c are included in an SDN network 460. Each of the network devices 420b and 420c transmits information on path calculation, to an SDN controller 461, using an SDN protocol. In the unit of a configuration that is similar to that of the network device 220 in FIG. 16, the last two digits of the reference numeral are matched with those of the unit in the network device 220 in FIG. 16, and the description is omitted as appropriate.

In the example of FIG. 18, the SDN controller 461 is a processing unit that functions as the wavelength-selective device 100, and selects a new path. The SDN controller 461 is, for example, a personal computer or a workstation. The SDN controller 461 performs path selection as follows. The SDN controller 461 obtains information on path calculation from each of the network devices 420a to 420c, and outputs the information on path calculation to a path calculation device 440. The path calculation device 440 outputs information on the new path, to the SDN controller 461. The SDN controller 461 selects a path as the new path from one or more paths that are allowed to be configured as the new path, based on the output information on the new path. After that, the SDN controller 461 configures the selected path by communicating with the device controller 427 of each of the network devices 420a to 420c.

The wavelength-selective device 100 includes the searching unit 111 that searches for paths that are allowed to be used in a network in which a plurality of communication devices communicates with each other, and the selection unit 112 that selects a wavelength to which the ending time that is the closest to the ending time of the new path has been set, from one or more wavelengths that are used by the found paths that are allowed to be used in the network. In addition, the wavelength-selective device 100 includes the configuration unit 113 that configures a path that uses the selected wavelength as the new path. As a result, the configurations of the paths that share an identical wavelength are released at approximately the same time, so that the configuration of the wavelength resource is released efficiently, and the wavelength resource may be utilized efficiently by promoting the recycle of the wavelength resource.

When a wavelength to which the ending time that is earlier than the ending time of the new path has been set is included in the one or more wavelengths that are used by the found paths that are allowed to be used in the network, the selection unit 112 selects a wavelength to which the ending time that is the closest to the ending time of the new path has been set, from the wavelengths. As a result, extension of the ending time of the wavelength is avoided, and delay of a time at which the configuration of the wavelength resource is released may be avoided.

The selection unit 112 selects a wavelength that is included in a first wavelength band, for a new path to which the ending time has been set, and selects a wavelength that is included in a second wavelength band, for a new path to which the ending time is not set. As a result, a wavelength of "definite term" is assigned to a path of "definite term", so that the configuration of the wavelength of "definite term" may be released stably after the ending time of the wavelength has come.

When there is no wavelength that is allowed to be selected, in the first wavelength band, the selection unit 112 selects a wavelength that is included in the second wavelength band, for the new path to which the ending time has been set. As a result, even when a wavelength of "definite term" is not available, a wavelength may be assigned to the path of "definite term".

Other Embodiments

Some of modifications of the above-described embodiments are described below. In addition to the modifications described below, design change may be performed as appropriate without departing from the spirit of the embodiments.

In the above-described embodiments, the wavelength-selective device 100 preferentially assigns a short wavelength to a new path, but the embodiments are not limited to such an example. For example, the wavelength-selective device 100 may preferentially assign a long wavelength to a new path.

In addition, the processing procedure, the control procedure, the specific name, and the information that includes the various pieces of data and parameters described in the embodiments may be arbitrarily changed unless otherwise specified.

Hardware Configuration of Information Processing Device

Figure 19:
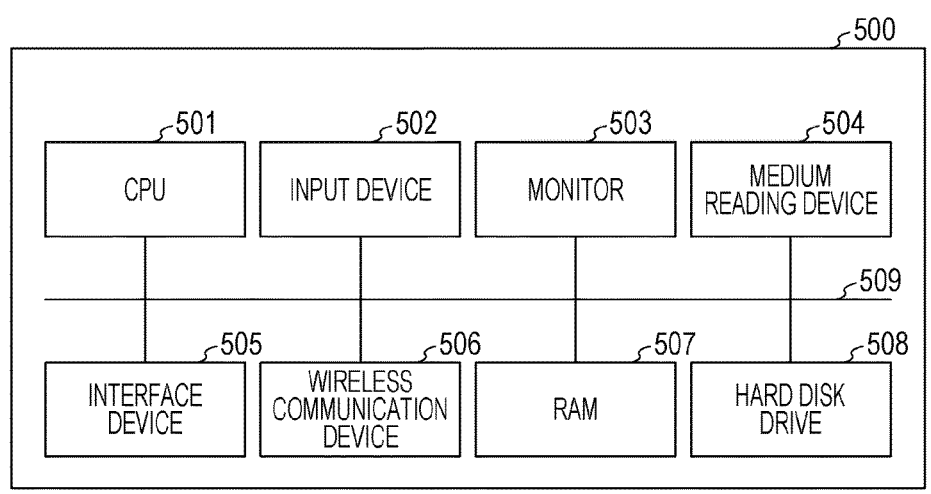
FIG. 19 is a diagram illustrating a hardware configuration of the wavelength-selective device.

FIG. 19 is a diagram illustrating a hardware configuration of the wavelength-selective device. As illustrated in the example of FIG. 19, a computer 500 includes a CPU 501 that executes various pieces of calculation processing, an input device 502 that accepts data input from the user, and a monitor 503. In addition, the computer 500 further includes a medium reading device 504 that reads a program and the like from a storage medium, an interface device 505 that is used to connect the device to a further device, and a wireless communication device 506 that is used to connect the device to a further device through radio waves. In addition, the computer 500 further includes a RAM 507 that temporarily stores various pieces of information, and a hard disk drive 508. In addition, the units 501 to 508 are connected to each other through a bus 509.

In the hard disk drive 508, for example, information processing programs are stored that includes functions that are similar to those of the processing units such as the searching unit 111, the selection unit 112, the configuration unit 113, and the update unit 114 illustrated in FIG. 1. In addition, in the hard disk drive 508, information processing programs are stored that includes functions that are similar to those of the processing units such as the searching unit 111, the selection unit 112, the configuration unit 113, and the update unit 114. In addition, in the hard disk drive 508, various pieces of data that are used to achieve the information processing programs are stored.

The CPU 501 execute various pieces of processing by reading the programs that are stored in the hard disk drive 508, and deploying the programs to the RAM 507, and executing the programs. These programs may cause the computer 500 to function, for example, as the searching unit 111, the selection unit 112, the configuration unit 113, and the update unit 114 illustrated in FIG. 1. In addition, these programs may cause the computer 500 to function as the searching unit 111, the selection unit 112, the configuration unit 113, and the update unit 114.

The above-described information processing programs may not be stored in the hard disk drive 508. For example, the programs that are stored in the storage medium from which the computer 500 may perform reading may be read and executed by the computer 500. The storage medium from which the computer 500 may perform reading corresponds to, for example, a portable recording medium such as a CD-ROM, a DVD disk, a Universal Serial Bus (USB) memory, a semiconductor memory such as a flash memory, a hard disk drive, or the like. In addition, such programs are stored in a device that is connected to a public line, the Internet, or a local area network (LAN), and the computer 500 may read the programs from the device and execute the programs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wavelength-selective device comprising:
a storage in which a wavelength management table is stored; and
a processor configured to execute a procedure, the procedure comprising:
searching for one or more paths used as a new path having a first ending time in a network, based on the wavelength management table;
selecting, from one or more wavelengths used on paths found by the searching, a wavelength having a second ending time closest to the first ending time; and
configuring a path using the selected wavelength as the new path,
wherein the wavelength management table has data related to a path type and the second ending time associated with the wavelength to be selected, the wavelength being used in the network,
wherein an ending time of the first ending time and the second ending time indicates a date and time in which a configuration of the path is released, and
wherein the path type includes a first wavelength group having wavelengths to which a path in which the second ending time has been set is assigned, a second wavelength group having wavelengths to which a path in which the second ending time has not been set is assigned, and a third wavelength group having wavelengths to which a path is not assigned.

2. The wavelength-selective device according to claim 1, wherein the second ending time is earlier than the first ending time.

3. The wavelength-selective device according to claim 1, wherein
in the selecting, a wavelength included in the first wavelength group is selected for a new path to which the first ending time is set, and a wavelength included in the second wavelength group is selected for a new path to which the first ending time is not set.

4. The wavelength-selective device according to claim 3, wherein
in the selecting, when there is no wavelength that is allowed to be selected, in the first wavelength group, the wavelength that is included in the second wavelength band is selected for the new path.

5. A wavelength-selective method, performed by a wavelength-selective device, comprising:
searching for one or more paths used as a new path having a first ending time in a network, based on a wavelength management table having information of an usage status of a path in a network including the wavelength-selective device;
selecting, from one or more wavelengths used on paths found by the searching, a wavelength having a second ending time closest to the first ending time; and
configuring a path using the selected wavelength as the new path,
wherein the wavelength management table has data related to a path type and the second ending time associated with the wavelength to be selected, the wavelength being used in the network,
wherein an ending time of the first ending time and the second ending time indicates a date and time in which a configuration of the path is released, and
wherein the path type includes a first wavelength group having wavelengths to which a path in which the second ending time has been set is assigned, a second wavelength group having wavelengths to which a path in which the second ending time has not been set is assigned, and a third wavelength group having wavelengths to which a path is not assigned.

6. A wavelength-selective system comprising:
a plurality of communication devices; and
a wavelength-selective device connected to the plurality of communication devices, the wavelength-selective device including:
a storage in which a wavelength management table having information of a path usage status received from the plurality of communication devices is stored; and
a processor configured to execute a procedure, the procedure including:
searching for one or more paths used as a new path having a first ending time in a network, based on the wavelength management table;
selecting, from one or more wavelengths used on paths found by the searching, a wavelength having a second ending time closest to the first ending time; and
configuring a path using the selected wavelength as the new path,
wherein the wavelength management table has data related to a path type and the second ending time associated with the wavelength to be selected, the wavelength being used in the network, wherein an ending time of the first ending time and the second ending time indicates a date and time in which a configuration of the path is released, wherein the path type includes a first wavelength group having wavelengths to which a path in which the second ending time has been set is assigned, a second wavelength group having wavelengths to which a path in which the second ending time has not been set is assigned, and a third wavelength group having wavelengths to which a path is not assigned.

\* \* \* \* \*